Patented June 24, 1930

1,767,759

UNITED STATES PATENT OFFICE

WILLY O. HERRMANN AND HANS DEUTSCH, OF MUNICH, GERMANY, ASSIGNORS TO CONSORTIUM FÜR ELEKTROCHEMISCHE INDUSTRIE G. M. B. H., OF MUNICH, BAVARIA, GERMANY

SOLID RESINOUS CONDENSATION PRODUCT

No Drawing.  Application filed April 4, 1921. Serial No. 458,610.

This invention relates to a process of manufacturing resinous condensation products. It is known that in the condensation of acetaldehyde with alkaline substances viscous resin-like compounds are obtained, which are known by the name of aldehyde resins. These aldehyde resins have been looked upon as undesirable by-products of no technical possibilities and it was not until quite recently that they have been utilized for certain technical purposes, for example, as a substitute for linseed oil.

Our present invention is based on the discovery that it is possible to obtain from the viscous resin-like products, which, for example, are formed by the action of an alkali upon aliphatic aldehyde with more than one carbon atom, as, for instance, acetaldehyde, solid resinous condensation products of valuable technical properties, by subjecting these viscous products of condensation to a further treatment with alkaline acting means.

When further subjecting these viscous resin-like products to a treatment with alkaline acting means, while taking proper care that these products are brought into contact with the alkaline solution in a finely divided state, solid resinous condensation products will be obtained, which may be filtered, pulverized, and freed from the alkaline solution.

Instead of starting from the viscous resin-like products, one may start from their parent substances, i. e. the aliphatic aldehydes and their non-resinous transformation products, such as paraldol, dimere of crotonaldehyde. As alkaline substances hydroxides, and carbonates and sulphides of the alkali group, the hydroxides of alkali earth group and other alkaline compounds may be used.

Both concentration and quantity of the alkaline substances may be subjected to changes within very wide limits.

Acetaldehyde may also advantageously be used in the shape of a vapor diluted with indifferent gases, which would serve as a mixing agent for the liquid. It is of practical value to let the gas circulate, so that part of the reaction heat, which has become free, may be removed, by the condensation of the gaseous water. If desired, one may add a suitable solvent, such as paraldehyde, to the solution for the solid masses, which are formed during reaction.

Solidification of the viscous products of condensation by the employment of alkaline substances in accordance with this invention may likewise be effected by rolling or kneading them with alkali lye.

Example 1

500 parts of acetaldehyde are gradually introduced into a container with 300 parts of 20% sodium solution, which container must be provided with a vigorously acting stirring device and a cooling jacket. Under dissipation of heat, which may be done by cooling, first of all some fluid products are obtained which, on the continued treatment with the sodium solution quickly become more viscous or tough and finally assume the shape of a solid red-colored compound. This may then be separated from the superfluous liquid by filtration or otherwise.

Example 2

Add 300 parts of a 10% sodium solution to 300 parts of paraldehyde into a stirring vessel provided with a cooling jacket. To this are gradually added 500 parts of acetaldehyde. After the reaction ceases, the resinous solution thus produced is separated from the mother liquor and the resinous condensation product may be obtained from the solving agent by a refining process. One may, however, also employ the solution direct, for example, for use as a varnish.

Example 3

500 parts of aldol are introduced, while stirring and cooling, into 500 parts of a 5% sodium solution. The process of the reaction corresponds to that referred to in Example No. 1. After a short time, solid resinous condensation products will be obtained.

Example 4

400 parts of crotonaldehyde are introduced, while stirring and cooling, into 200 parts of a 10% sodium solution. The reaction corresponds to that referred to in Example No. 1. After some time, solid resinous compounds are obtained.

Example 5

500 parts of acetaldehyde are introduced, while stirring and cooling, into 500 parts of a 5% solution of sulphide of sodium. The process is similar to that referred to in Example No. 1 in which a sodium solution is employed and solid resinous substances are obtained.

The products obtained in accordance with our invention are solid masses at ordinary temperature; their melting point lying above 50° C. According to duration and manner of treatment, they range from transparent to nearly opaque, and from a light yellow to a dark reddish brown. They possess a vivid gloss and their degree of hardness increases with the duration and intensity of the treatment with alkaline acting means. Their melting point increases in the same measure, it eventually resting at between 100° and 200° C., and it may even reach 300° C. They are soluble in organic solvents, such as alcohol, acetone, anhydrous acetic acid, linseed oil, turpentine oil and others. Such solutions may be employed for varnishing and polishing purposes, more especially for treating, for example, wooden, metallic and plaster of Paris surfaces. They are especially useful for first-coating and further for the impregnation of wood, card board, textiles and other porous fabrics.

All these solid resinous condensation products may be transformed into shaped solid and workable articles under the application of pressure and preferably under higher temperatures, all with or without filling or charging agents, such as sawdust, asbestos, and the like.

Upon treating these solid amorphous bodies with mineral acids, preferably after the preparatory solution of the resin-products in organic solving agents, such as anhydrous acetic acid, yellow substances are obtained by precipitation with water, which will not fuse until raised to above 300° C. and which are very capable of resisting temperature influences. They may be employed in a manner similar to the bodies, above referred to.

What we claim is:

1. A method of producing solid resinous condensation products from liquid aldehydes in one step, consisting in allowing alkaline substances to react at temperatures above 30° C. upon aliphatic aldehydes with more than one carbon atom, the condensation being not stopped when viscous reaction products are formed but continued until the reaction product is practically totally converted into a resin substantially insoluble in alkaline lye.

2. A method of producing solid resinous condensation products from liquid aldehydes in one step consisting in allowing alkaline substances to react at temperatures above 30° C. upon the liquid intermediary products of condensation of aliphatic aldehydes with more than one carbon atom, the condensation being not stopped when viscous reaction products are formed but continued until the reaction product is practically totally converted into a solid resin substantially insoluble in alkaline lye.

3. A method of producing solid resinous condensation products from liquid aldehydes in one step consisting in allowing alkaline substances to react at temperatures above 30° C. upon aliphatic aldehydes with more than one carbon atom, the condensation being not stopped when viscous reaction products are formed but continued until the reaction product is practically totally converted into a solid resin substantially insoluble in alkaline lye in the presence of solvents.

4. A method of producing solid resinous condensation products from liquid aldehydes in one step consisting in allowing alkaline substances to react at temperatures above 30° C. upon the liquid intermediary products of condensation of aliphatic aldehydes with more than one carbon atom, the condensation being not stopped when viscous reaction products are formed but continued until the reaction product is practically totally converted into a solid resin substantially insoluble in alkaline lye in the presence of solvents.

5. A method of producing solid resinous condensation products from liquid aldehydes in one step consisting in allowing alkaline substances to react at temperatures above 30° C. upon aliphatic aldehydes with more than one carbon atom, the condensation being not stopped when viscous reaction products are formed but continued until the reaction product is practically totally converted into a solid resin substantially insoluble in alkaline lye under intensive mechanical dispersion.

6. A method of producing solid resinous condensation products from liquid aldehydes in one step consisting in allowing alkaline substances to react at temperatures above 30° C. upon the liquid intermediary products of condensation of aliphatic aldehydes with more than one carbon atom, the condensation being not stopped when viscous reaction products are formed but continued until the reaction product is practically totally converted into a solid resin substantially insoluble in alkaline lye under intensive mechanical dispersion.

7. A method of producing solid resinous condensation products from liquid aldehydes in one step consisting in allowing alkaline substances to react at temperatures above 30° C. upon aliphatic aldehydes with more than one carbon atom, the condensation being not stopped when viscous reaction products are formed but continued until the reaction product is practically totally converted into a solid resin substantially insoluble in alkaline lye and treating the product obtained with mineral acid and water.

8. A method of producing solid resinous condensation products from liquid aldehydes in one step consisting in allowing alkaline substances to react at temperatures above 30° C. upon the liquid intermediary products of condensation of aliphatic aldehydes with more than one carbon atom, the condensation being not stopped when viscous reaction products are formed but continued until the reaction product is practically totally converted into a solid resin substantially insoluble in alkaline lye and treating the product obtained with mineral acid and water.

9. A method of producing solid resinous condensation products from liquid aldehydes in one step consisting in allowing alkaline substances to react at temperatures above 30° C. upon aliphatic aldehydes with more than one carbon atom, the condensation being not stopped when viscous reaction products are formed but continued until the reaction product is practically totally converted into a solid resin substantially insoluble in alkaline lye, dissolving the product obtained in a solvent, treating this solution with mineral acid and precipitating the resin by water.

10. A method of producing solid resinous condensation products from liquid aldehydes in one step consisting in allowing alkaline substances to react at temperatures above 30° C. upon the liquid intermediary products of condensation of aliphatic aldehydes with more than one carbon atom, the condensation being not stopped when viscous reaction products are formed but continued until the reaction products are practically totally converted into a solid resin substantially insoluble in alkaline lye, dissolving the product obtained in a solvent, treating this solution with mineral acid and precipitating the resin by water.

11. A method of producing solid resinous condensation products from liquid aldehydes in one step consisting in allowing alkaline substances to react at temperatures above 30° C. upon acetaldehyde, the condensation being not stopped when viscous reaction products are formed but continued until the reaction product is practically totally converted into a solid resin substantially insoluble in alkaline lye.

12. Solid resinous condensation products obtained by allowing alkaline substances to react at temperatures above 30° C. upon aliphatic aldehydes with more than one carbon atom, the condensation being not stopped when viscous reaction products are formed but continued until the reaction product is practically totally converted into a solid resin substantially insoluble in alkaline lye.

13. Solid resinous condensation products obtained by allowing alkaline substances to react at temperatures above 30° C. upon the liquid intermediary products of condensation of aliphatic aldehydes with more than one carbon atom, the condensation being not stopped when viscous reaction products are formed but continued until the reaction product is practically totally converted into a solid resin substantially insoluble in alkaline lye.

14. Solid resinous condensation products obtained by allowing alkaline substances to react at temperatures above 30° C. upon aliphatic aldehydes with more than one carbon atom, the condensation being not stopped when viscous reaction products are formed but continued until the reaction product is practically totally converted into a solid resin substantially insoluble in alkaline lye and treating the solid resinous product with mineral acid and water.

15. Solid resinous condensation products obtained by allowing alkaline substances to react at temperatures above 30° C. upon the liquid intermediary products of condensation of aliphatic aldehydes with more than one carbon atom, the condensation being not stopped when viscous reaction products are formed but continued until the reaction product is practically totally converted into a solid resin substantially insoluble in alkaline lye and treating the solid resinous product with mineral acid in dissolution in an organic solvent.

In testimony whereof we affix our signatures.

WILLY O. HERRMANN.
HANS DEUTSCH.